United States Patent
Kukulski et al.

(10) Patent No.: US 10,036,445 B2
(45) Date of Patent: Jul. 31, 2018

(54) IMPACT ENERGY ABSORBING DEVICE

(71) Applicant: AXTONE SPOLKA AKCYJNA, Kanczuga (PL)

(72) Inventors: Jan Kukulski, Kosina (PL); Leszek Wasilewski, Gniewczyna (PL)

(73) Assignee: Axtone Spolka Akcyjna, Kanczuga (PL)

( * ) Notice: Subject to any disclaimer, the term of this patent is extended or adjusted under 35 U.S.C. 154(b) by 0 days.

(21) Appl. No.: 15/506,869

(22) PCT Filed: Jun. 8, 2015

(86) PCT No.: PCT/IB2015/054312
§ 371 (c)(1),
(2) Date: Feb. 27, 2017

(87) PCT Pub. No.: WO2016/030775
PCT Pub. Date: Mar. 3, 2016

(65) Prior Publication Data
US 2017/0254382 A1 Sep. 7, 2017

(30) Foreign Application Priority Data
Aug. 27, 2014 (PL) .......................... 409278

(51) Int. Cl.
*F16F 9/48* (2006.01)
*F16F 9/32* (2006.01)
(Continued)

(52) U.S. Cl.
CPC ................ *F16F 9/483* (2013.01); *F16F 9/19* (2013.01); *F16F 9/3214* (2013.01);
(Continued)

(58) Field of Classification Search
CPC ........ F16F 9/483; F16F 9/3235; F16F 9/3228; F16F 9/3214; F16F 9/363; F16F 2230/04;
(Continued)

(56) References Cited

U.S. PATENT DOCUMENTS

| 4,085,925 A | * | 4/1978 | Peddinghaus | F16F 9/06 188/282.8 |
| 5,157,806 A | * | 10/1992 | Wartian | E05F 3/02 16/49 |

(Continued)

FOREIGN PATENT DOCUMENTS

| EP | 0806587 A1 | 11/1997 |
| EP | 1350704 A1 | 10/2003 |

(Continued)

OTHER PUBLICATIONS

PCT International Search Report dated Sep. 29, 2015, Application No. PCT/IB2015/054312, Applicant Axtone Spolka Akcyjna, 3 Pages.

(Continued)

*Primary Examiner* — Pamela Rodriguez
(74) *Attorney, Agent, or Firm* — Brooks Kushman P.C.

(57) ABSTRACT

A device having two glands leading a piston rod the glands being located at one side of a piston, whereas an inner gland divides the chamber inside the closed cylinder into a working chamber limited axially by an inner surface of a bottom and into a lubricating chamber limited axially by the inner surface of the outer gland. The working chamber has a flow zone shaped as the cylinder with its inner diameter increased, placed adjacent to the inner gland, as well as the compression zone, whereas the inner diameter of the cylinder is slidingly fitted with the outer diameter of the piston.

12 Claims, 4 Drawing Sheets

(51) Int. Cl.
*F16F 9/36* (2006.01)
*F16F 9/19* (2006.01)

(52) U.S. Cl.
CPC .......... *F16F 9/3228* (2013.01); *F16F 9/3235* (2013.01); *F16F 9/3242* (2013.01); *F16F 9/3278* (2013.01); *F16F 9/362* (2013.01); *F16F 9/363* (2013.01); *F16F 2230/04* (2013.01); *F16F 2236/04* (2013.01)

(58) Field of Classification Search
CPC ...... F16F 2236/04; F16F 9/362; F16F 9/3242; F16F 9/19; F16F 9/3278
USPC ......... 188/288, 283, 284, 282.5, 282.6, 280, 188/322.15, 322.17, 322.18
See application file for complete search history.

(56) References Cited

U.S. PATENT DOCUMENTS

| | | | | |
|---|---|---|---|---|
| 5,566,794 | A | * | 10/1996 | Wiard ........................ F16F 9/34 188/287 |
| 5,657,511 | A | | 8/1997 | Lan |
| 5,971,117 | A | * | 10/1999 | Grundei .................. F16F 9/346 188/284 |
| 9,366,306 | B2 | | 6/2016 | Miyasato et al. |

FOREIGN PATENT DOCUMENTS

| | | | |
|---|---|---|---|
| GB | 2312659 | A | 11/1997 |
| JP | 2014152888 | A | 8/2014 |
| PL | 212572 | B1 | 10/2012 |
| PL | 401424 | A1 | 5/2014 |
| RU | 95105306 | A | 11/1996 |
| RU | 2197401 | C2 | 1/2003 |
| RU | 2 251 507 | C2 | 5/2005 |
| RU | 45 697 | U1 | 5/2005 |
| WO | 2013190961 | A1 | 12/2013 |

OTHER PUBLICATIONS

PCT International Written Opinion dated Sep. 29, 2015, Application No. PCT/IB2015/054312, Applicant Axtone Spolka Akcyjna, 5 Pages.
Polish International Search Report dated Sep. 11, 2014, Sprawozdanie O Stanie Techniki Zgloszenia NR P-409278, 1 Page.
Russian Search Report dated Feb. 20, 2018, Application No. P.4 09278, 2 Pages.
State Intellectual Property Office of China, Chinese Search Report for the corresponding Chinese Patent Application No. 2015800461068 dated Apr. 4, 2018.

\* cited by examiner

IMPACT ENERGY ABSORBING DEVICE

CROSS-REFERENCE TO RELATED APPLICATION

This application is the U.S. national phase of PCT Application No. PCT/IB2015/054312 filed on Jun. 8, 2015, which claims priority to PL Patent Application No. P.409278 filed on Aug. 27, 2014, the disclosures of which are incorporated in their entirety by reference herein.

The present invention relates to a device absorbing energy of impacts between railway vehicles. This invention refers especially to a device having a structure that ensures multistage energy absorption as may be required.

BACKGROUND ART

From Polish patent specification PL212572 the railway buffer is known comprising a cylinder in which rubber spring elements are used, said elements constituting the first bump energy absorbing stage. The second stage of absorbing energy in this known solution is created by an outer deformable tube led by an additional guiding sleeve on an immobile bush of a bumper, whereas this immobile bush of the bumper is used in extreme conditions of a collision as the first cut element constituting the third energy absorbing element.

From Polish patent application P.401424 a railway bumper is also known comprising a flow damping cylinder having its inner space limited by distant glands guiding a piston by a double-sided piston rod. This cylinder is also used for placing rubber ring dumpers in it, as well as an element being cut in extreme collision conditions.

The aim of this invention is to create an impact energy absorbing device having greater resistance against lateral forces. Said device, despite its simplified structure, should be able to absorb and amortize great energy portions in extraordinary situations such as collisions between rail vehicles, as well as to smoothly absorb variable forces existing during the usual exploitation.

DISCLOSURE OF INVENTION

A device absorbing energy of impacts between rail vehicles according to this invention comprises a cylinder closed with a bottom. Inside this cylinder there is located a piston connected with a piston rod running axially in glands and going outside the front plane of the cylinder. The invention is characterized by the presence of two glands located at one side of the piston, whereas the inner gland divides the inner space of the closed cylinder into a working chamber axially limited by an inner surface of a bottom, as well as into a lubricating chamber limited axially by an inner surface of the outer gland. The working chamber has a flow zone characterized by a greater inner diameter of the cylinder situated nearby an inner gland, as well as a compression zone with an inner diameter of the cylinder being slidingly fitted in with the outer diameter of the piston.

Advantageously, between the flow zone and the compression zone there is created at least one interim zone with a gradually changing inner diameter of the cylinder.

Advantageously, said interim zone has a conically changing inner diameter of the cylinder.

Advantageously, the piston has an arched front surface as well as a sliding ring.

Advantageously, at least one overflow valve is located in the piston.

Advantageously, at least one non-return valve is located in the piston.

Advantageously, at least one non-return valve is located in the piston.

Advantageously, at least one through opening is made in a bottom of the cylinder, said opening being closed with a screwed-in plug.

Advantageously, there is used a valve for introducing the working fluid under pressure into the working chamber, the valve being located in the bottom of the cylinder.

Advantageously, the outer gland has a sliding bush guiding a piston rod, said sliding bush forming a front support for said piston rod.

Advantageously, the inner gland has a cylindrical sealing packet forming simultaneously a rear support for the piston rod.

Thanks to placing two glands at one side of a piston, a piston connected with it in the cylinder can be exactly axially led to enable the proper work of the device under the increased cross load. At the same time, this structure makes it able to divide the inner space of the cylinder into a working chamber compressing working fluid which is viscous, stingy, and absorbing kinetic energy, as well as into a lubricating chamber filled with lubricant used for lubricating a piston rod moving in glands. Moreover, thanks to dividing the working chamber into a flow zone with a greater inner diameter and into a compression zone having its inner diameter slidingly fitted with an outer diameter of the piston, small energy portions in normal exploitation conditions as well as great energy portions in extremal collision conditions may be smoothly taken over.

Thanks to using an intermediate zone having a gradually decreasing inner diameter of the cylinder, it is possible to progressively change from a flow phase, in which a quantity of absorbed energy is determined substantially by suppression parameters of the working fluid being compressed. In case when only one intermediate zone is used in the device according to the invention between a flow phase and a compression phase, a three-stage progressive impact energy characteristic is obtained.

It is easy to introduce a stream of the working fluid into a slot created between the piston and the cylinder during the flow phase when a front surface of a piston is shaped as an arched one, whereas a sliding ring placed on the piston eliminates the possibility of seizing the piston in the cylinder as a result of changing working conditions.

An overflow valve situated in a piston allows the working fluid to flow in the compression phase when the piston is moved slidingly in the cylinder, and thanks to that, the additional suppression of the kinetic energy is obtained. However, the non-return valve is used to facilitate the return motion to its initial position after the compression action.

Using a valve to force the working fluid into the working chamber makes it easy to obtain an initial pressure affecting the energy absorption parameters.

Thanks to using a slide bush in the outer gland, as well as a cylindrical sealing packed in the inner gland, the piston rod can be slidingly supported. This solution protects also against the migration of the working fluid into the lubricating chamber, and guarantees also obtaining the great stability of the piston rod support, as well as the proper lubrication, which enables a multiple increase in the durability of the device according to the invention. Such an increased stability of the piston rod makes it possible to embed the piston in the cylinder by using a play in the form of a ring slot through which the working fluid is forced during the flowing phase.

BRIEF DESCRIPTION OF DRAWINGS

This invention is presented in its embodiment in the drawing, in which.

MODES FOR CARRYING OUT THE INVENTION

Figure 1:
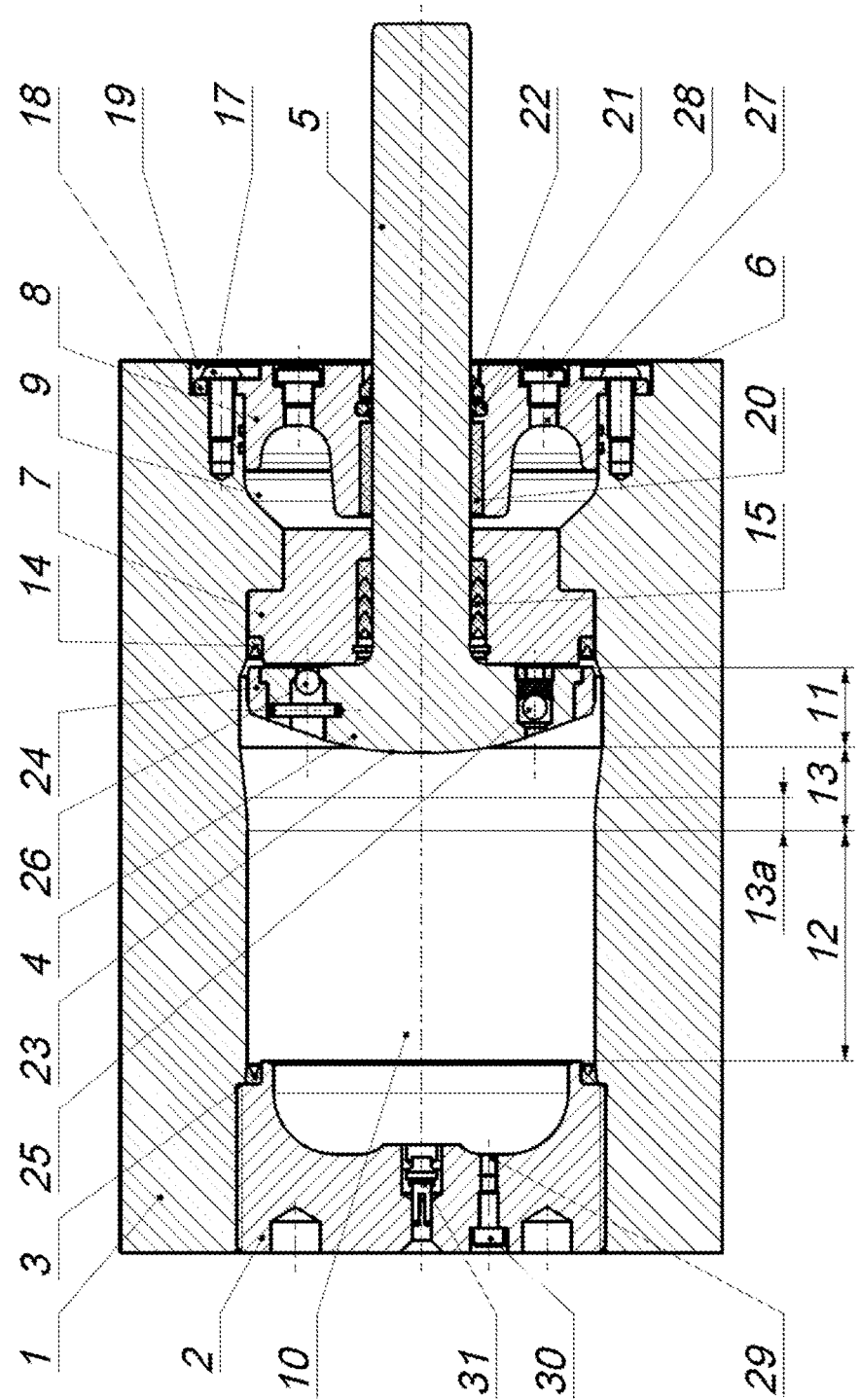
FIG. 1 presents a device according to the invention absorbing energy of impacts between railway vehicles in their standstill before striking in its axial section.

The device absorbing the energy of the impact between railway wagons according to the invention shown in the embodiment in FIG. 1 comprises a cylinder 1 with a screwed-in bottom 2 comprising a sealing ring 3. Inside the cylinder 1 there is embedded a piston 4 joined with a unilateral piston rod 5 projecting behind a front plane 6 of the cylinder 1, led axially in two distant from each other glands 7, 8. Between the inner gland 7 and the outer gland 8 there is created a lubricating chamber 9 for storing lubricant, and a space of the cylinder 1 created between the inner glands 7 and the bottom 2 is the working chamber 10. This working chamber 10 has a flow zone 11 having an increased inner diameter, said zone beginning placed adjacent to the inner gland 7, as well as a compression zone 12, the inner diameter of which is slidingly fitted to the diameter of the piston 4, said zone extending to the bottom 2. In order to ensure the gentle change from the flow phase to the compression phase, the working chamber 10 has an additionally created interim zone 13 having its diameter changing conically. This interim zone 13 may comprise as well an additional stage 13a with the diminished slope to additionally mitigate the passage to the compression zone 12.

In an embodiment not shown in the drawing, the working fluid may flow also through additional openings in the piston. By suitable selection of the amount and the diameter of said additional openings, one can further shape the energy takeover characteristics. In another embodiment not shown in the drawing, the interim zone 13 can take an arc shape or any shape having experimentally selected slopes in order to provide the previously determined parameters of progressiveness of absorbing the kinetic energy of impacts.

The inner gland 7 is fastened by being pressed into the cylinder 1 and it has an outer sealing ring 14 as well as a cylindrical sealing packet 15 working simultaneously as the back support of the piston rod 5. The outer gland 8 is fit tightly in the cylinder 1 by means of sealing rings and is fastened by screws 17 in such a way that its collar 18 is hidden in a groove 19 rolled up in the front part of the cylinder 1. The outer gland 8 has a sliding bush 20 made of bronze, said bush acting as the front support of the piston rod 5, as well as sealing rings 21 and 22 protecting lubricant against flowing out from the lubricating chamber 9.

The piston 4 in the embodiment presented in the drawing has arched front surface 23. On the stepped circumference of the piston 4 there is embedded a sliding ring 24 made of a material having better sliding properties, for example bronze. The middle part of the piston 4 made as a monolithic part with the piston rod 5 comprises an overflow valves 25 as well as a non-return valve 26 arranged regularly in the same distance from the axis of the piston rod 5.

The lubricating chamber is filled with lubricant through openings 27 made in the outer gland 8, whereas said openings after this operation are closed by screwed-in plugs 28. Whereas the working chamber 10 is filled with the working fluid by using openings 29 made in the bottom 2, said openings are afterwards blinded with screwed-in plugs 30. The bottom 2 has moreover a valve 31 for forcing the working fluid under pressure into the working chamber under the determined initial pressure. After introducing the working fluid, the valve 31 is automatically closed.

Figure 2:
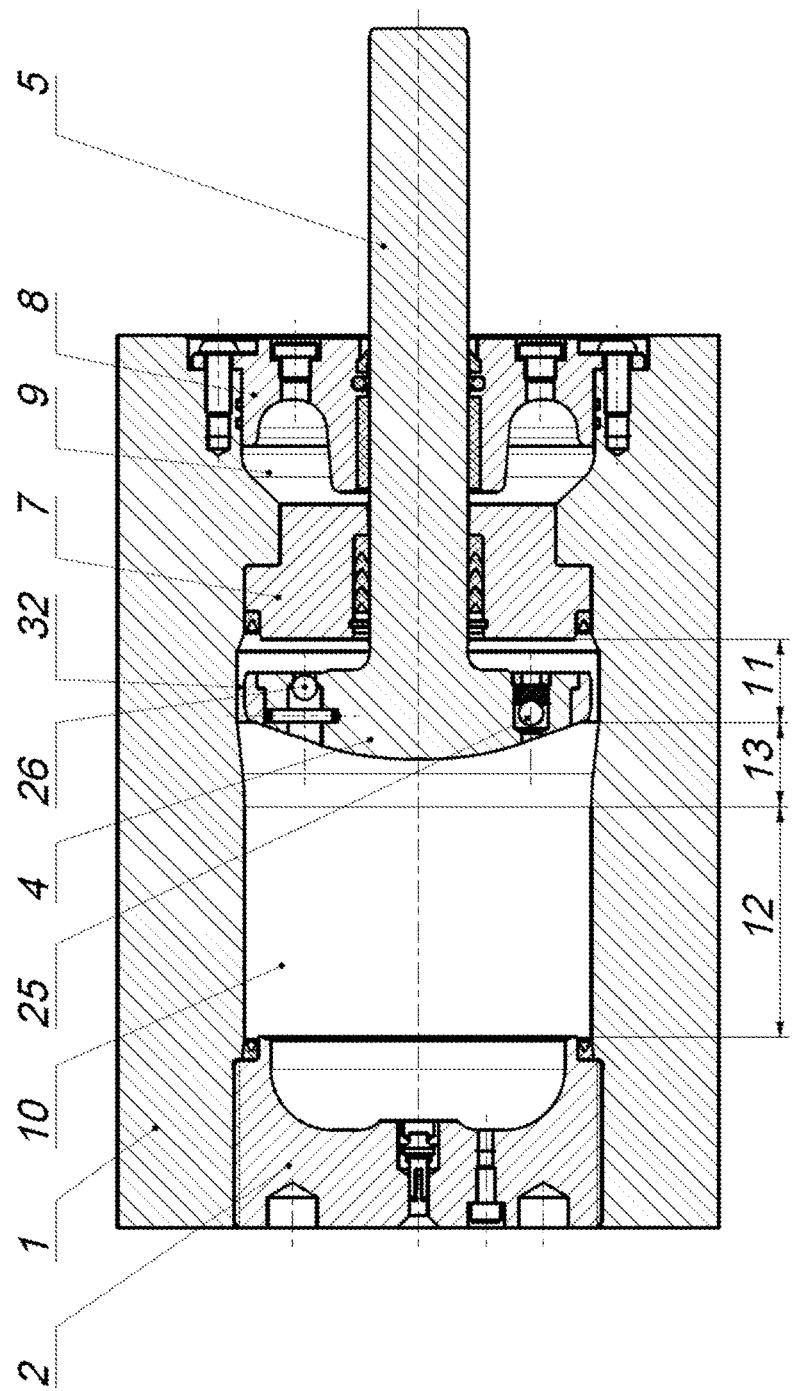
FIG. 2 presents the absorbing device as its axial section during absorbing the impact energy with the piston shifted to a flow zone.

In FIG. 2 there is shown the piston 4 situated in the flow zone 11. A ring slot 32 created between the sliding ring 24a and the cylinder 1 in this area makes it possible to force through the working fluid having a determined viscosity. While the piston 4 works in this zone, the non-return valve 26 as well as the overflow valve 25 are closed.

Figure 3:
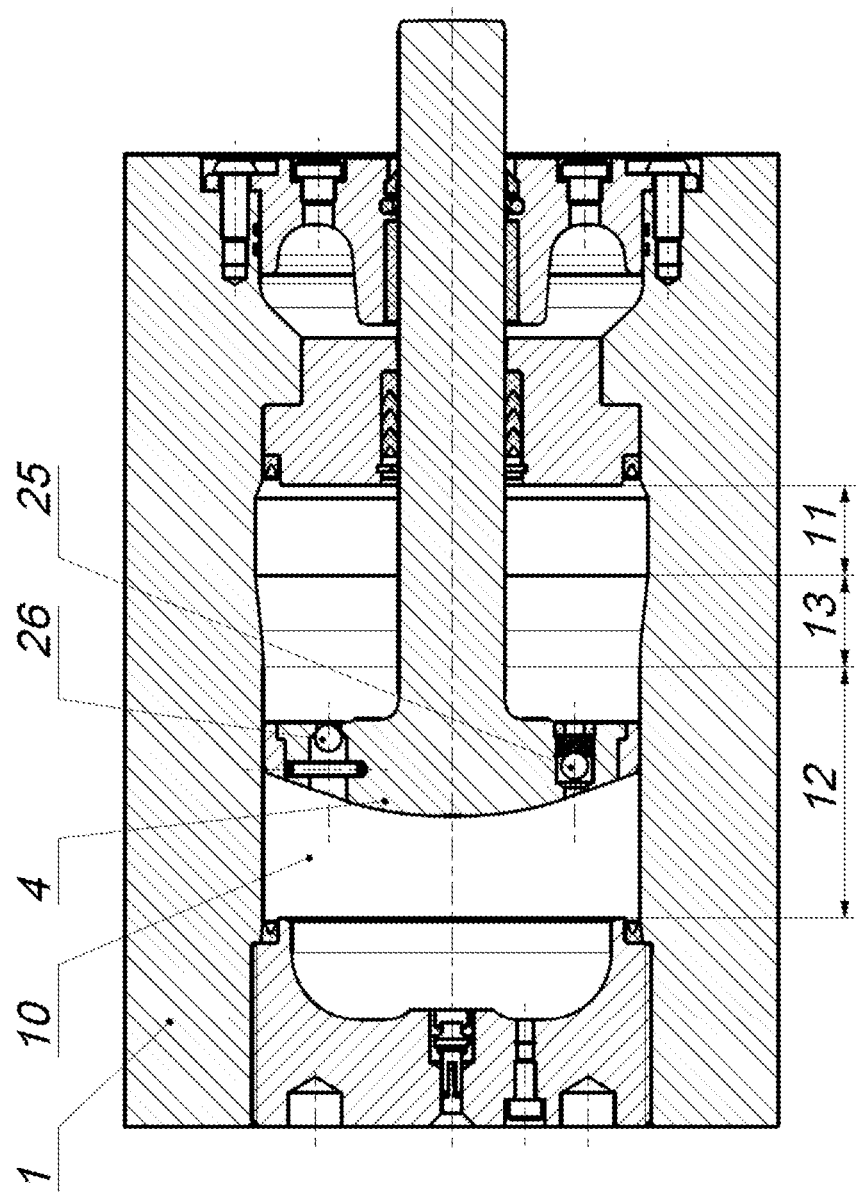
FIG. 3 presents the absorbing device as its axial section during absorbing the increased impact energy with the piston shifted to a compression zone.

In FIG. 3 there is shown the piston 4 in the compression zone 12. The piston 4 is moved slidingly in the working chamber 10 of the cylinder 1 in order to press the working fluid not forced formerly during working in the flow zone 11 and in the interim zone 13. When the piston 4 works inside this zone, the non-return valve 26 is closed, whereas the overflow valve 25 opens causing the compressed working fluid to flow into the second part of the working chamber 10 at the opposite side of the piston 4.

After absorbing the impact energy, the pressure of the piston 4 ceases, and the compressed working fluid turns aside said piston into the flow zone 11. During this movement, the non-return valve 26 is opened to enable the return flow of the working fluid.

Figure 4:
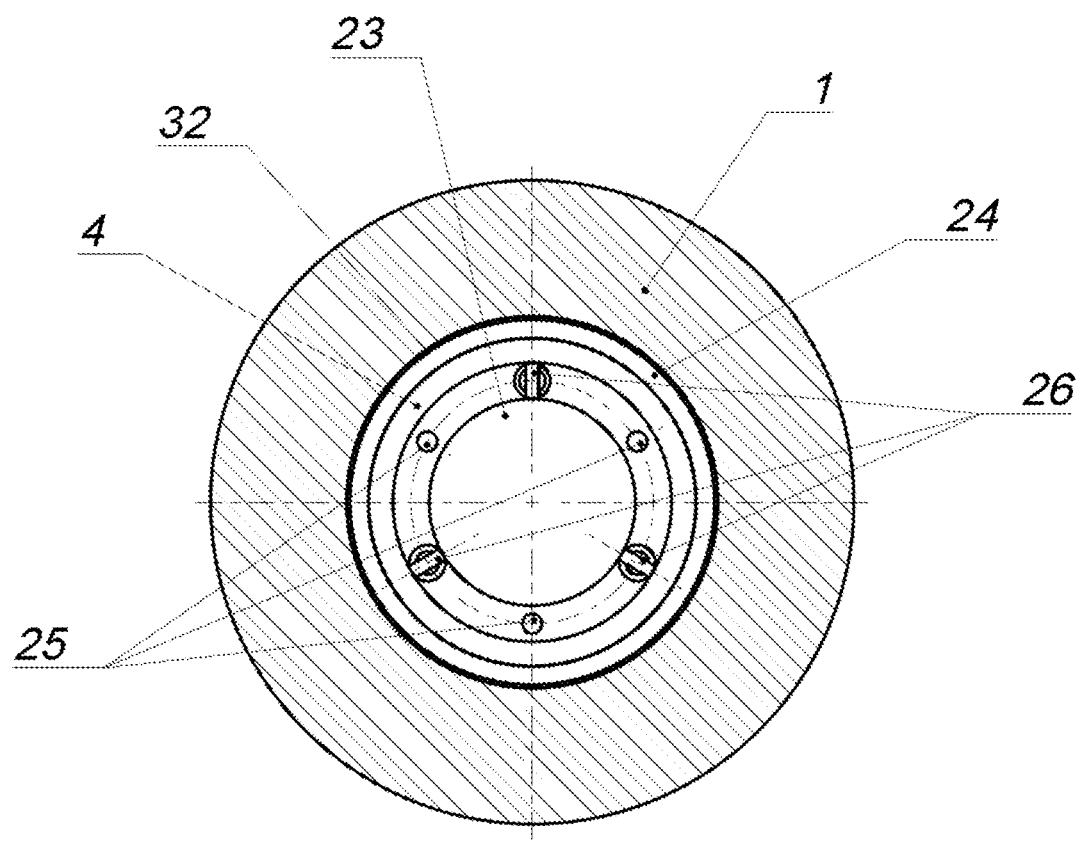
FIG. 4 presents a section of the cylinder showing a front surface of the piston in its flow position.

As it is shown in FIG. 4, the piston 4 comprises regularly arranged three redundant flow valves 25 as well as three non-return valves 26. This arrangement of the overflow valves 25 and the non-return valves 26 provides the uniform distribution of forces created by the working fluid flowing during the action of the device according to the invention, which is essentially important for the axial movement of the piston 4 in the cylinder and for holding the regular ring slot 32.

The invention claimed is:

1. A device for absorbing energy of impacts created by railway vehicles, the energy absorbing device comprising a closed cylinder ended with a bottom inside which there is a piston connected with a piston rod axially led through glands and protruding out of the front plane of the cylinder, wherein
    the glands are located on one side of the piston, whereas an inner gland divides a chamber created inside the cylinder into a working chamber limited axially by an inner surface of the bottom and a lubricating chamber limited axially by an inner surface of an outer gland, whereas
    the working chamber has a flow zone having the cylinder with its inner diameter increased, placed adjacent to the inner gland, and a compression zone having an inner diameter of the cylinder slidingly fit with the outer diameter of the piston.

2. The energy absorbing device according to claim 1, wherein the working chamber further has an interim zone with a gradually changing inner diameter of the cylinder, the interim zone is between the flow zone and the compression zone.

3. The energy absorbing device according to claim 2, wherein the interim zone has a conically changing inner diameter of the cylinder.

4. The energy absorbing device according to claim 1, wherein the piston has an arched front surface.

5. The energy absorbing device according to claim 1, wherein the piston has a sliding ring.

6. The energy absorbing device according to claim 1, wherein at least one overflow valve is located in the piston.

7. The energy absorbing device according to claim 1, wherein at least one non-return valve is located in the piston.

8. The energy absorbing device according to claim 1, wherein the outer gland has at least one through opening closed with a screwed-in plug.

9. The energy absorbing device according to claim 1, wherein at least one through opening is made in the bottom of the cylinder, the opening being closed with a screwed-in plug.

10. The energy absorbing device according to claim 1, wherein a valve located in the bottom of the cylinder is used to force the working fluid under pressure into the working chamber.

11. The energy absorbing device according to claim 1, wherein the outer gland has a sliding bush leading the piston rod.

12. The energy absorbing device according to claim 1, wherein the inner gland has a cylindrical sealing packet.

\* \* \* \* \*